July 9, 1946.　　　　W. H. NEWELL　　　　2,403,544
GUNFIRE CONTROL COMPUTER
Filed Feb. 21, 1941　　　　2 Sheets-Sheet 1

INVENTOR
*William H. Newell*
ATTORNEY

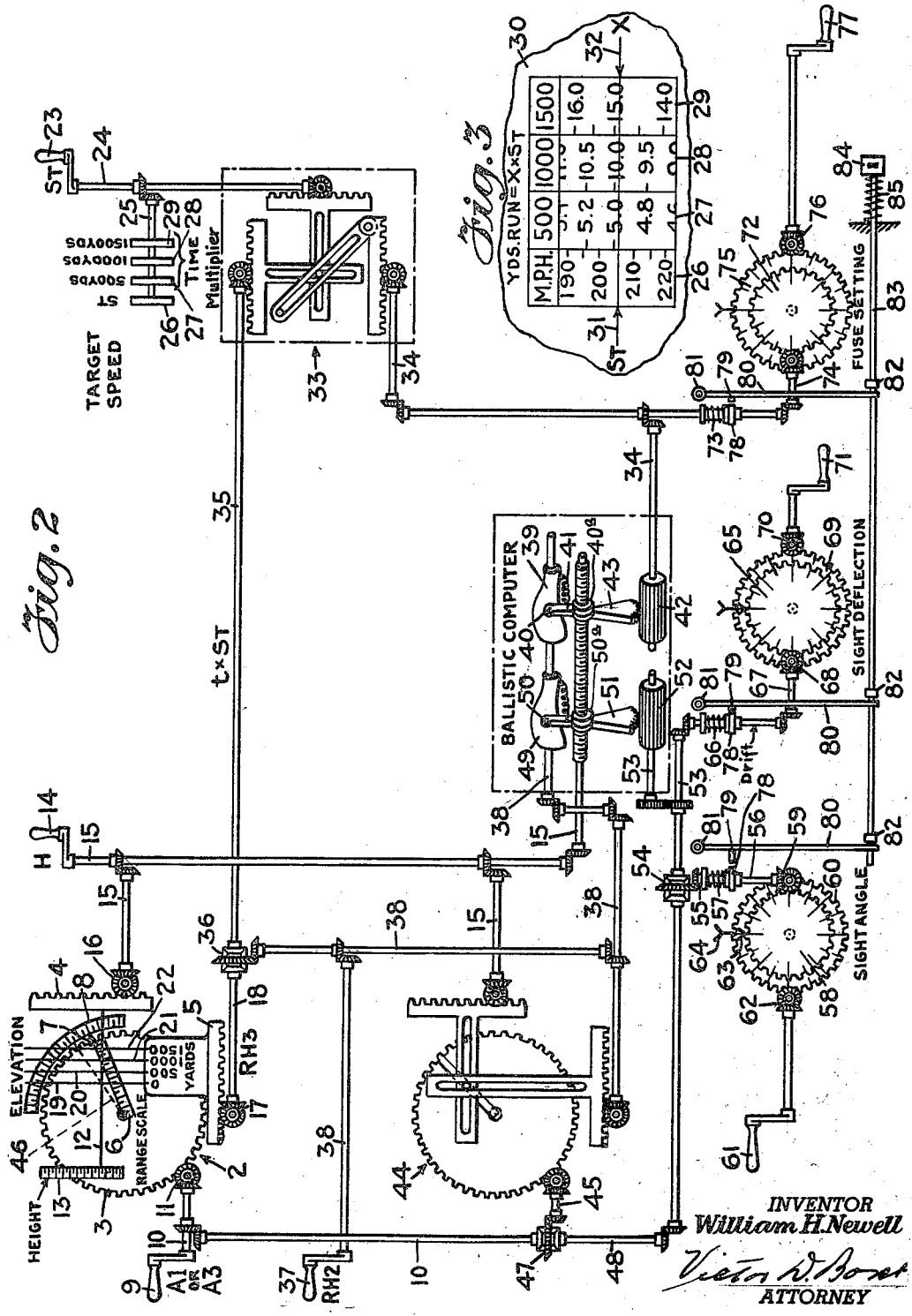

Patented July 9, 1946

2,403,544

UNITED STATES PATENT OFFICE 2,403,544

GUNFIRE CONTROL COMPUTER

William H. Newell, New York, N. Y., assignor to Ford Instrument Company, Inc., Long Island City, N. Y., a corporation of New York Application February 21, 1941, Serial No. 379,926

6 Claims. (Cl. 235—61.5)

This invention relates to gun-fire control computers and particularly to that type of computers used to control the firing of guns against aircraft.

The problem of the control of gun-fire against aircraft may be divided into two classes; (1) where the aircraft or target is approaching directly towards its objective or the point of observation and the firing gun, and (2) where the target is passing at a distance to one side or the other of the observing and firing point. The invention herein disclosed is applied to the first mentioned class. It will of course be understood that some of the principles thereof are applicable to the solution of problems of the second mentioned class.

In considering the solution of the problem of anti-aircraft fire control to which this invention is applied as one embodiment thereof, it is assumed that the target is directly approaching its objective, which is the point of observation and the point of firing of the gun, at a substantially constant height above the horizontal plane of the objective, such as would be done in horizontal-bombing of a selected point. Upon the picking up of the target by observers at the objective, the slant range of the target and its elevation above the horizontal, expressed in angular units, are observed by instruments well known in the art and from the observed data the height of the target and the horizontal range may be determined, or if the height of the target is known or obtained by observations and the elevation is observed, the slant range and the horizontal range may be determined.

From experimental data obtained during target practices, the most effective ranges of the guns are known as well as the time in seconds required to set and adjust the sights and the fuses of the projectiles and to load and fire the projectiles. In this specification, the time required to set the observed values into the mechanisms, for the mechanisms to calculate the advance range or fuse setting and the sight angle, and the time required to adjust the sight and gun and load and fire the gun is defined as the "preparation period of time." This preparation period is arbitrarily selected and is based upon experience under various circumstances of operation.

An object of the invention is to provide a mechanism settable in accordance with the speed of the target and including a vector analyzer settable in accordance with the range or height and elevation angle of a moving aircraft target at the observing instant.

It is a further object of the invention to provide a scale or chart, associated with the target speed setting means, to aid the operator in selecting one of a plurality of predetermined distances that the target will move during the necessary preparation period of time and to provide a plurality of indicators on the horizontal range component member of the vector analyzer spaced so as to correspond to the predetermined distances associated with the target speed setting. By the aid of these indicators the operator may reset the vector analyzer in accordance with the range and elevation angle of the target at the time of firing.

It is a further object of the invention to actuate ballistic and angle computing mechanisms in accordance with the computed positions of the target to determine and indicate the sight and fuse setting data for the guns.

Mechanisms for accomplishing the objects of the invention and their operation will be understood by considering the following description and accompanying drawings in which:

Fig. 2 is a diagrammatic view of a mechanism to compute the values required in the control of the fire of the gun; and Fig. 3 is an enlarged view of the target speed dial of Fig. 2.

Figure 1:
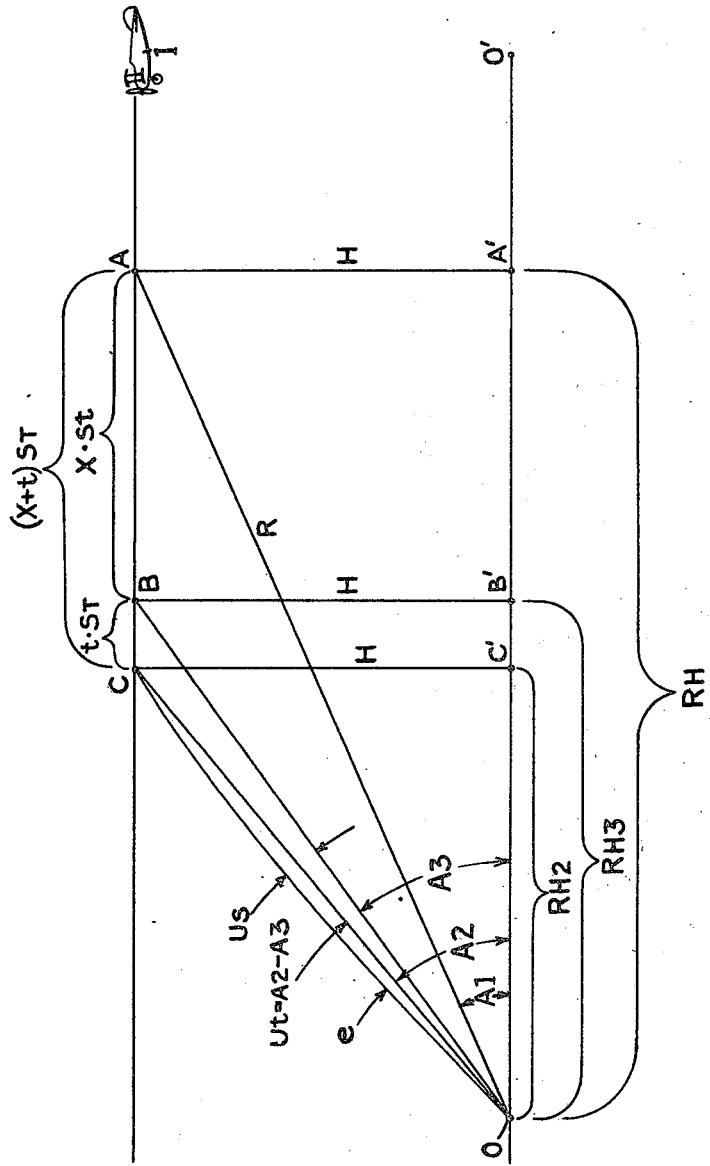
Fig. 1 is an elevation side view of an aircraft target directly approaching an observing and firing point at a constant height and showing the consecutive angular and linear relations of the target to the observing and firing point.

Referring particularly to Fig. 1, an aircraft or target 1 is directly approaching the observing and firing point O at a constant height (H) above the horizontal O—O' and at a horizontal speed of $St$.

When the target 1 reaches point A, observers at O observe the slant range (R) and the elevation angle of the target (A1), from which the height (H) and the horizontal range (RH) may be calculated by the equations resulting from the right angle triangle $OAA'$ of $H=R \sin A1$ and $RH=R \cos A1$, respectively. $A'$ is the projection of the point A on the horizontal O—O'.

The distance traveled by the target during the necessary preparation period of time (X) is selected as required and is represented by the length of line AB, thus defining the point B at which the target 1 will be at the end of the preparation period. The value of the distance AB may be expressed by the equation $$AB = X \cdot St \qquad (1)$$

The horizontal range of target 1 at point B (RH3) is equal to the observed horizontal range minus the distance AB or $$RH3 = RH - X \cdot St \qquad (2)$$

From the right angle triangle $OBB'$, the elevation of the target when at point B (A3) will be the angle whose tangent is the height divided by the horizontal range to the point B, or $$A3 = \tan^{-1} \frac{H}{RH3} \qquad (3)$$

From ballistic tables or curves obtained from experimental data the time of flight $(t)$ of projectiles is known for various combinations of horizontal ranges and heights. As is well known the time of flight ($t$) is the period of time between the instant of firing of the projectile and the instant of its intercepting the target. The travel of the target during this period of time is equal to the speed of the target multiplied by the time of flight or $t \cdot St$, and is indicated on Fig. 1 by the line BC, or $$BC = t \cdot St \quad (4)$$

This distance determines the point of intercept (C) and a perpendicular dropped from C determines the point C'. It is obvious that OC' represents the horizontal range to the point of intercept (RH2), and that $$RH2 = RH3 - (t \cdot St) \text{ or } RH3 = RH2 + (t \cdot St) \quad (5)$$

The elevation angle of the point of intercept (A2) is obtained from the right angle triangle OCC' and is the angle whose tangent is the height divided by the horizontal range to the point of intercept (RH2) or $$A2 = \tan^{-1} \frac{H}{RH2} \quad (6)$$

The elevation of the gun above the line of sight to the point B, to allow for the movement of the target during the time of flight is known as vertical angular deflection ($Ut$) and may be expressed as $$Ut = A2 - A3 \quad (7)$$

Also from ballistic tables and curves obtained from experimental data the correction in elevation, known as super elevation ($e$), that must be applied to compensate for the shape of the trajectory of the projectile, is known for various combinations of horizontal ranges and heights. The total elevation of the gun above the line of sight is known as sight angle ($Us$) and may be expressed as $$Us = Ut + e \quad (8)$$

Referring particularly to Fig. 2, the vector analyzer 2 consists of a vector disk 3 and two component slides 4 and 5.

The disk 3 has a radial range scale 6 engraved thereon. The range scale 6 terminates in an index 7 cooperating with an angular scale 8 fixedly mounted on the frame (not shown) of the instrument to indicate the angular position of the disk 3. The vector disk 3 is angularly positioned by the handle 9 connected to the disk 3 by the shaft 10 and gears 11.

The component slide 4 is restrained by guides (not shown) to move vertically, that is at right angles to the plane of the constructive horizontal diameter of the disk 3 and carries a stiff wire 12 extending across the disk 3 parallel to the said constructive horizontal diameter. This wire represents height (H) of the target and its position relative to the center of the disk 3 is indicated by the height scale 13 read against the end of the wire 12. The slide 4 and the wire 12 are located in accordance with the height of the target by the handle 14 acting through the shafting 15 and the gears 16.

The component slide 5 is restrained by guides (not shown) to movement relative to the disk 3 parallel to the wire 12, by means of gears 17 and shaft 18, the actuation of which will be hereinafter described. The slide 5 carries four vertical wires 19, 20, 21 and 22 extending across the disk 3. The wire 19 is nearest to the center of the disk 3 and is designated by the graduation 0. The other wires 20, 21 and 22 are designated 500, 1000 and 1500 yards respectively, in accordance with the distance represented by their displacement from the zero wire 19.

As the range and height scales and the spacing of the vertical wires are all made to the same scale it will be seen that when the range scale 6, height wire 12 and one of the change of range wires 19, 20, 21 or 22 intersect a right angle triangle is formed of which the sides represent height and horizontal range respectively, and the hypothenuse represents the direct range (R), while the angle of the hypothenuse or disk 3 represents the elevation angle of the target.

The target speed ($St$) is set into the mechanism by handle 23, shaft 24 and shaft 25 which carries the dial 26 for indicating the speed set into the mechanism. The speed dial 26 is cylindrical and has three other cylindrical dials 27, 28 and 29 mounted adjacent to it for rotation by shaft 25.

These four dials are shown in greater detail in Fig. 3 from which their operation and purpose will be more readily understood.

On the outer surface of dial 26 is engraved a scale graduated in miles per hour of the speed of the target. On the outer surfaces of dials 27, 28 and 29 are engraved scales graduated in seconds of time and representing the time required for the target to move respectively five hundred yards, one thousand yards and fifteen hundred yards at the corresponding speeds as graduated on dial 26. Above the rings and on a supporting structure 30 are engraved letters or numbers for identifying the graduations on the dials and also index marks 31 and 32 by which the distance traveled by the target during different values of the preparation periods (X) may be determined for various values of the speed of the target ($St$). In the setting disclosed in Fig. 3, it is shown that for a speed of the target of two hundred and five miles per hour, the distance traveled by the target during values of X of five, ten, and fifteen seconds, is 500, 1000 and 1500 yards respectively.

Assuming the operator knows that ten seconds as the preparation period of time is sufficient but that five seconds would be too short a time, he therefore sees from the group of dials, especially ring 28, that the run of the target during this preparation period of ten seconds is 1000 yards. As this 1000 yards represents the preparation period (X) times the target speed ($St$) or the distance A—B of Fig. 1, it will be seen that for these particular conditions the distance AB or RH minus RH3 is equal to $X \cdot St$, or 1000 yards.

In setting the ring 26 to the target speed ($St$) the operator also sets the target speed, in this case, two hundred and five miles an hour, into the multiplier 33 by shaft 24. The value of the period of the time of flight ($t$), the generation of which will be described hereinafter, is also set into multiplier 33 by shaft 34. The output shaft 35 of multiplier 33 is connected to actuate one member of differential 36 and is positioned by the multiplier in proportion to $t \cdot St$ or the distance B—C of Fig. 1, which equals the horizontal range (RH3) minus horizontal range (RH2).

Having determined, from the indication above the dials 27, 28 or 29, the distance the target will travel during the selected preparation time (X), the operator sets in the observed elevation value (A1) by turning the handle 9 to rotate the disk 3 until the index 7 is opposite the desired value of the scale 8. For the assumed conditions indicated by Fig. 3, and ten seconds preparation period, the operator then moves the horizontal range slide 5 from the position where its zero yard wire 19 passes through the center of disk 3 until the 1000 yard wire 21 is positioned to intersect the range scale 6 at the observed slant range (R). The slide 5 is positioned by handle 37 and shaft 38 and shaft 35 which are connected to shaft 18 through differential 36.

It will be seen that the position of the 1000 yard wire 21 relative to the center of the disk 3 now represents the horizontal range (RH) corresponding to the observed range (R) and since the zero wire 19 is permanently spaced from the wire 21 a distance representing 1000 yards, the distance of the zero wire from the center of the disk 3 will represent the horizontal range (RH3). This relation will be seen from Equation 2 since $X \cdot St$ equals 1000 yards. The rotative position of shaft 18 connected to slide 5 will therefore also represent the horizontal range (RH3). Since the rotational position of shaft 18 due to the combined effect of shafts 35 and 38 represents the horizontal range (RH3) and shaft 35 represents ($t \cdot St$) it will be seen from Equation 5 that because of the differential 36 the rotational position required of shaft 38 will represent the horizontal range (RH2) to the point of intercept (C).

The corresponding value of height (H) for the assumed conditions is obtained by turning shaft 15 by handle 14 until wire 12 intersects the 1000 yard wire 21 where wire 21 crosses the range scale 6 at the observed direct range graduation.

The value of the period of the time of flight is generated by a conventional three-dimensional cam 39 which consists of a solid rotated by the shaft 38, the surfaces of the various lateral cross-sections of the solid along its axis forming individual cam surfaces to give to cam follower 40 and its associated arm an angular motion about a threaded carriage 40a proportional to the time of flight of the projectile for the range represented by the rotational position of the solid and the value of height represented by the axial position of the follower 40. The threaded carriage 40a for cam follower 40 is moved parallel to the axis of the solid cam to engage the follower 40 with the various lateral sections of the cam, in accordance with the value of height (H), by the rotational position of the threaded portion of shaft 15 which carries the threaded carriage. It will be understood that the threaded carriage is held against rotational movement by guide means not shown. Cam follower 40 is kept in engagement with the cam surface by spring 41 and its motion is transmitted to elongated gear 42 on shaft 34 by toothed sector 43.

The elevation angle of the target at point C is obtained by a conventional vector solver 44 the component inputs of which are connected to shaft 15 the movement of which represents height (H) and shaft 38 the movement of which represents horizontal range (RH2). The output of vector solver 44 is shaft 45 the rotational position of which represents the elevation angle (A2) to the point C as shown by Equation 6.

The elevation angle (A3) of the target at point B is obtained from vector analyzer 2. It has been explained that the position of the slide 5 and the zero wire 19 represent the horizontal range (RH3) to the point B. If the operator now rotates disk 3 by handle 9 until the range scale 6 crosses the zero wire 19 where wire 19 intersects the height wire 12 the position of disk 3 and the rotational position of shaft 10 will represent the elevation angle (A3) as shown by Equation 3. This position of the range scale 6 is indicated by the dotted line 46 on Fig. 2.

The values of elevation angles (A3) as represented by the rotational position of shaft 10, and of (A2) as represented by the rotational position of shaft 45, are combined in differential 47, the output of which, shaft 48, represents the elevation prediction angle (Ut) which is equal to $A2-A3$, as shown by Equation 7.

The super elevation angle (e) which is added to the elevation prediction angle Ut to obtain the sight angle (Us), as shown by Equation 8, is a function of the height (H) and the horizontal range (RH2) when the target is at point C. From experimental data a ballistic three-dimensional cam 49 may be made similar in construction and operation to cam 39 previously described, except that the surface of the solid cam is such that cam follower 50 is moved about its threaded carriage 50a on the shaft 15 so that the sector 51 rotates elongated gear 52 mounted on shaft 53 in proportion to the super elevation (e).

As the sight angle (Us) is equal to the prediction angle (Ut) plus the super elevation (e), shafts 48 and 53 are connected to differential 54, the output of which is gear 55. The rotational position of gear 55 therefore represents the sight angle (Us). Gear 55 is connected to shaft 56 through a yieldable drive 57, such as a centralizing spring. Shaft 56 is connected to graduated dial 58 by gear 59. Corrections may be applied to the readings of dial 58 by rotating the ring dial 60 by the handle 61 and gears 62. The ring dial 60 is mounted coaxially with dial 58 and carries an index 63 against which dial 58 is read. Graduations on ring dial 60 are read against the fixed index 64 to indicate the amount the index 63 is displaced from its normal position.

As is well known, the deflection of the sight due to drift is proportional to the super elevation, therefore shaft 53 is connected to rotate a deflection dial 65 through a yieldable drive 66, shaft 67 and gears 68. Corrections may be applied to the readings of dial 65 by ring dial 69 mounted coaxially with dial 65 and moved by gears 70 turned by handle 71.

As the time of fuse setting is proportional to the time of flight of the projectile, the values of fuse settings are made visually available by connecting shaft 34 to dial 72 through a yieldable drive 73 and shaft 74. Corrections may be applied to the readings of dial 72 by ring dial 75 mounted coaxially with dial 72 and moved by gears 76 which is turned by handle 77.

The yieldable drives 57, 66 and 73 are provided in the connections to the output dials 58, 65 and 72 respectively, to permit the dials to be locked in position as soon as a solution has been obtained so that while the readings are being taken from the dials the operator may change the input settings in accordance with new observations.

To lock the dials when desired, the ends of the yieldable drives connected to the dials are each provided with a brake drum 78. Cooperating with each brake drum 78 is a brake-shoe 79 mounted on an arm 80. The arms 80 are pivoted to the frame of the instrument on pivots 81. The free ends of the arms 80 are adjacent to collars 82 on a locking rod 83 which is actuated by a push knob or button 84. The locking rod is normally held in its out position by a spring 85 one end of which abuts against the under side of button 84 and the other end against the frame of the instrument.

Normally the locking button is in its out position and the dials 58, 65 and 72 are driven in accordance with the driving end of the yieldable drive. When the button 84 is pressed the brake-shoes 79 come in contact with the brake drums 78 and lock the dials while the mechanism may be reset with consequent displacement of the yieldable drive. When the button 84 is released the brakes are released and the dials come into agreement with the new computed values.

It is obvious that various changes may be made by those skilled in the art in the details of the invention as disclosed in the drawings and described above within the principle and scope of the invention as expressed in the appended claims.

I claim:

1. Apparatus for use in aiming a gun for firing a projectile at a target approaching at a constant height above a horizontal plane, comprising a vector analyzer including a vector member having a range scale angularly settable in accordance with elevation angles of the target and also including a first component slide settable to positions in accordance with the observed height of the target and a second component slide settable to positions in accordance with the horizontal range of the target, the first slide having an indicating wire thereon extending from the slide in a direction at right angles to the movement thereof and the second slide having thereon a zero reference wire and a plurality of wires spaced at distances therefrom representing predetermined increments of horizontal range through which the target moves during corresponding preparation periods of time and extending from the slide at right angles to the movement thereof, means settable in accordance with the speed of the target, means movable in accordance with a computed time of flight of the projectile, a multiplier settable by the target speed settable means and the time of flight movable means, means for setting the second slide with that one of its movement wires corresponding to the distance traversed in a preparation period in a position corresponding with the observed slant range and elevation of the target including an operating shaft and a differential one side of which is connected to the output of the multiplier and the other two sides of which are connected to the shaft and the second slide respectively, ballistic computing means connected to the first slide and to the operating shaft of the second slide setting means as inputs and having an output moved in accordance with the time of flight, and motion transmitting means connecting the output of the ballistic computing means and the time of flight movable means.

2. Apparatus for use in aiming a gun for firing a projectile at a target approaching at a constant height above a horizontal plane, comprising a vector analyzer including a vector member having a range scale angularly settable in accordance with elevation angles of the target and also including a first component slide settable to positions in accordance with the observed height of the target and a second component slide settable to positions in accordance with the horizontal range of the target, the first slide having an indicating wire thereon extending from the slide in a direction at right angles to the movement thereof and the second slide having thereon a zero reference wire and a plurality of wires spaced at distances therefrom representing predetermined increments of horizontal range through which the target moves during corresponding preparation periods of time and extending from the slide at right angles to the movement thereof, means settable in accordance with the speed of the target, means movable in accordance with a computed time of flight of the projectile, a multiplier settable by the target speed settable means and the time of flight movable means, means for setting the second slide with that one of its increment wires corresponding to the distance traversed in a preparation period in a position corresponding with the observed slant range and elevation of the target including an operating shaft and a differential one side of which is connected to the output of the multiplier and the other two sides of which are connected to the shaft and the second slide respectively, ballistic computing means connected to the first slide and to the operating shaft of the second slide setting means as inputs and having an output moved in accordance with the time of flight, motion transmitting means connecting the output of the ballistic computing means and the time of flight movable means, and means connected to the target speed settable means for indicating increments of movement of the target for corresponding periods of preparation time.

3. Apparatus for use in aiming a gun for firing a projectile at a target approaching at a constant height above a horizontal plane, comprising a vector analyzer including a vector member having a range scale angularly settable in accordance with elevation angles of the target and also including a first component slide settable to positions in accordance with the observed height of the target and a second component slide settable to positions in accordance with the horizontal range of the target, the first slide having an indicating wire thereon extending from the slide in a direction at right angles to the movement thereof and the second slide having thereon a zero reference wire and a plurality of wires spaced at distances therefrom representing predetermined increments of horizontal range through which the target moves during corresponding preparation periods of time and extending from the slide at right angles to the movement thereof, means settable in accordance with the speed of the target, means movable in accordance with a computed time of flight of the projectile, a multiplier settable by the target speed settable means and the time of flight movable means, means for setting the second slide with that one of its increment wires corresponding to the distance traversed in a preparation period in a position corresponding to the observed slant range and elevation of the target including an operating shaft and a differential one side of which is connected to the output of the multiplier and the other two sides of which are connected to the shaft and the second slide respectively, ballistic computing means connected to the first slide and to the operating shaft of the second slide setting means as inputs and having a first output moved in accordance with the time of flight and a second output moved in accordance with the super elevation angle, motion transmitting means connecting the first output of the ballistic computing means and the movable time of flight means, a vector solver settable by the first slide and the operating shaft of the second slide setting means, means responsive to angular movement of the range scale from an initial position representing an observed position of the target to a position intersecting both the first slide wire and the zero reference wire of the second slide, means for combining the movement of the responsive means and the output of the vector solver, and means for combining the output of the last mentioned combining means and the second output of the ballistic computing means whereby the sight angle is obtained.

4. In apparatus for use in the aiming of guns, a vector analyzer settable to represent the position of a target, means for initially setting said vector analyzer in accordance with the observed angular relation of a target from an observing station, a pair of rectangular component members associated with the said vector analyzer one of said members having a single indicating wire for indicating the height of the target from the observing station and the second of the said members having a plurality of indicating wires spaced to represent increments of movement of the target, means for setting the height component member in accordance with the height of a target, means for setting the second component member to bring the wires selectively into agreement with the horizontal range corresponding to the setting of the said vector analyzer, said last mentioned setting means including means settable in accordance with a horizontal range value and the output of a multiplying mechanism having two input members, means for actuating one of said input members in accordance with the target speed including target speed indicating means, means for actuating the other of the said input members in accordance with the time of flight of the projectile, a vector solver having one component input directly actuated by the means settable in accordance with a horizontal range value and a second component input actuated by the means for setting the height component member and having a vector member angularly positioned in accordance with the setting of the said component inputs, means associated with the target speed indicating means for indicating the time required by the target to traverse the increments of movement of the target represented by the indicating means associated with the second of said pair of component members, and means for combining the resulting angular positions of the vector member with the means for angularly setting the first mentioned vector analyzer, whereby the output of the combining means represents the angular movement of the target during the time of flight when the first mentioned vector analyzer is set in accordance with the intersection of the height component wire and a second of the plurality of indicating wires representing a desired increment of movement of the target from the observed position.

5. In apparatus for use in the aiming of guns, a vector analyzer settable to represent the position of a target, means for initially setting said vector analyzer in accordance with the observed angular relation of a target from an observing station, a pair of rectangular component members associated with the said vector analyzer one of said members having a single indicating wire for indicating the height of the target from the observing station and the second of the said members having a plurality of indicating wires spaced to represent increments of movement of the target, means for setting the height component member in accordance with the height of a target, means for setting the second component member to bring the wires selectively into agreement with the horizontal range corresponding to the setting of the said vector analyzer, said last mentioned setting means including means settable in accordance with a horizontal range value and the output of a multiplying mechanism having two input members, means for actuating one of said input members in accordance with the target speed including target speed indicating means, means for actuating the other of the said input members in accordance with the time of flight of the projectile, a vector solver having one component input directly actuated by the means settable in accordance with a horizontal range value and a second component input actuated by the means for setting the height component member and having a vector member angularly positioned in accordance with the setting of the said component inputs, means associated with the target speed indicating means for indicating the time required by the target to traverse the increments of movement of the target represented by the indicating means associated with the second of said pair of component members, means for combining the resulting angular positions of the vector member with the means for angularly setting the first mentioned vector analyzer, and ballistic computing means to determine the time of flight of the projectile, said computing means having input elements connected to the means for setting the height component member and the means settable in accordance with a horizontal range value.

6. In apparatus for use in the aiming of guns, a vector analyzer settable to represent the position of a target, means for initially setting said vector analyzer in accordance with the observed angular relation of a target from an observing station, a pair of rectangular component members associated with the said vector analyzer one of said members having a single indicating wire for indicating the height of the target from the observing station and the second of the said members having a plurality of indicating wires spaced to represent increments of movement of the target, means for setting the height component member in accordance with the height of a target, means for setting the second component member to bring the wires selectively into agreement with the horizontal range corresponding to the setting of the said vector analyzer, said last mentioned setting means including means settable in accordance with a horizontal range value and the output of a multiplying mechanism having two input members, means for actuating one of said input members in accordance with the target speed including target speed indicating means, ballistic computing means controlled jointly by the means settable in accordance with a horizontal range value and the means for setting the height component for actuating the other of the said input members in accordance with the time of flight of the projectile, and means connected with the target speed indicating means for indicating the times required for the target to traverse the several increments of movement of the target represented by the spacing of the plurality of indicating wires associated with the second of said pair of component members, thereby enabling the operator to select the proper indicating wire to denote the horizontal range of the target at the observed position set into the vector analyzer so that the position of the target after a predetermined increment of movement will be indicated by the intersection of a second indicating wire with the height wire.

WILLIAM H. NEWELL,